United States Patent
Nagamatsu

(10) Patent No.: US 11,527,003 B2
(45) Date of Patent: Dec. 13, 2022

(54) IMAGE PROCESSING APPARATUS, IMAGE CAPTURING APPARATUS, IMAGE PROCESSING METHOD AND STORAGE MEDIUM

(71) Applicant: CANON KABUSHIKI KAISHA, Tokyo (JP)

(72) Inventor: Yasunari Nagamatsu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 55 days.

(21) Appl. No.: 17/072,386

(22) Filed: Oct. 16, 2020

(65) Prior Publication Data
US 2021/0142495 A1    May 13, 2021

(30) Foreign Application Priority Data
Nov. 8, 2019    (JP) .............................. JP2019-203288

(51) Int. Cl.
| | | |
|---|---|---|
| G06T 7/50 | (2017.01) | |
| H04N 5/369 | (2011.01) | |
| G06T 7/44 | (2017.01) | |
| G06V 10/50 | (2022.01) | |
| G06V 10/75 | (2022.01) | |

(52) U.S. Cl.
CPC .................. *G06T 7/50* (2017.01); *G06T 7/44* (2017.01); *G06V 10/50* (2022.01); *G06V 10/758* (2022.01); *H04N 5/36965* (2018.08); *G06T 2207/20092* (2013.01)

(58) Field of Classification Search
CPC ........... G06T 7/50; G06T 7/44; G06K 9/4642; G06K 9/6212
USPC ......................................................... 382/172
See application file for complete search history.

(56) References Cited

U.S. PATENT DOCUMENTS

2016/0337576 A1* 11/2016 Nobayashi ................ G06T 7/70
2018/0137629 A1*  5/2018 Mishma ................ G06T 7/174

FOREIGN PATENT DOCUMENTS

| JP | 2003-269917 A | | 9/2003 |
| JP | 2004206665 A | * | 7/2004 |
| JP | 2012-163923 A | | 8/2012 |

* cited by examiner

*Primary Examiner* — Ayodeji O Ayotunde
(74) *Attorney, Agent, or Firm* — Carter, DeLuca & Farrell LLP

(57) ABSTRACT

A distance measurement accuracy is improved without increasing power consumption of an image processing apparatus that performs distance-measuring processing. In one embodiment, an image processing apparatus for calculating distance information on an image has a reliability calculation unit 113 configured to calculate reliability in accordance with contrast for each pixel of the image and a distance calculation unit 116 configured to calculate distance information on each of the pixels based on reliability of each of the pixels. The distance calculation unit 116 calculates the distance information about a second pixel group whose reliability is lower than that of a first pixel group by using a collation area whose size is larger than a predetermined size in a range in which an amount of calculation in a case where a collation area of the predetermined size is used for all the pixels of the image is not exceeded.

9 Claims, 12 Drawing Sheets

RESOLUTION 128×80

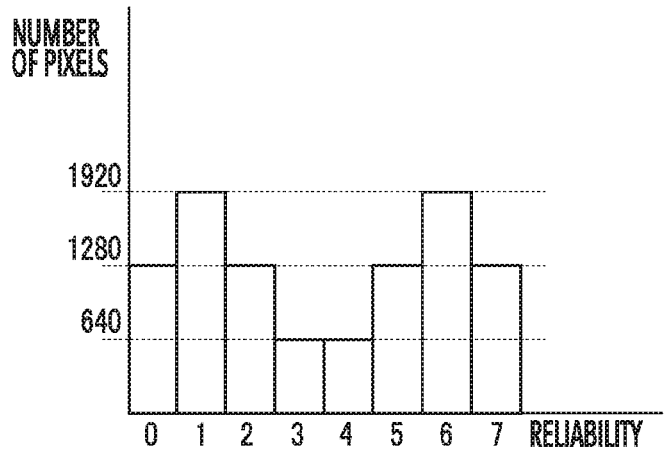

THRESHOLD VALUE SETTING OF RELIABILITY HIGH = 6
SIZE OF COLLATION AREA OF RELIABILITY HIGH = 5×5
SIZE OF COLLATION AREA OF RELIABILITY MEDIUM = 7×7

H_NUM = 3200

M_NUM = (49/25) * X

X ≒ (10240−3200)/2 = 3520

FIG.4A IN A CASE WHERE RELIABILITY 2 IS HANDLED AS MEDIUM, NUMBER OF PIXELS IS 3,840 AND THIS IS NOT ACCEPTABLE

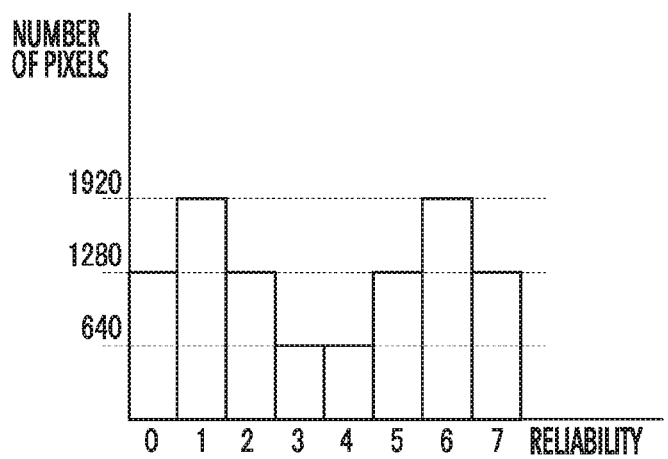

THRESHOLD VALUE SETTING OF RELIABILITY HIGH = 5
SIZE OF COLLATION AREA OF RELIABILITY HIGH = 5×5
SIZE OF COLLATION AREA OF RELIABILITY MEDIUM = 7×7

H_NUM = 4480

M_NUM = (49/25) * X

X ≒ (10240−4480)/2 = 2880

FIG.4B IN A CASE WHERE RELIABILITY 1 IS HANDLED AS MEDIUM, NUMBER OF PIXELS IS 4,480 AND THIS IS NOT ACCEPTABLE

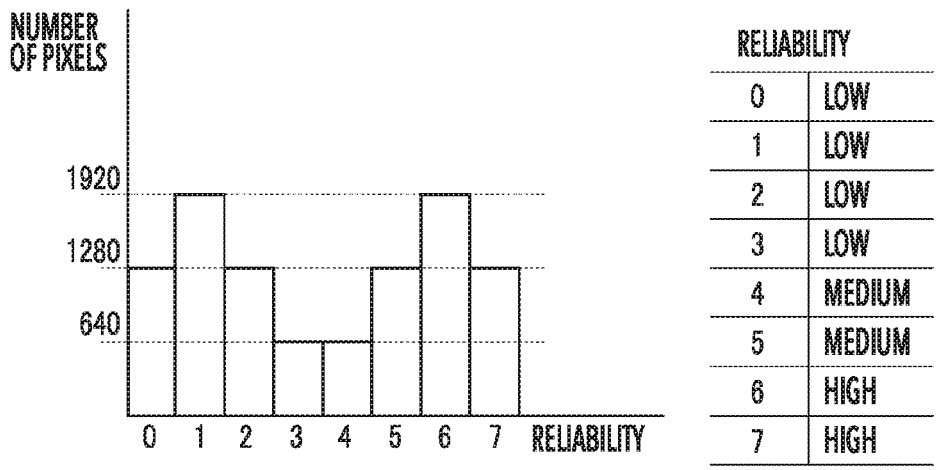
FIG.4C IN A CASE WHERE RELIABILITY 3 IS HANDLED AS MEDIUM, NUMBER OF PIXELS IS 2,560 AND THIS IS NOT ACCEPTABLE
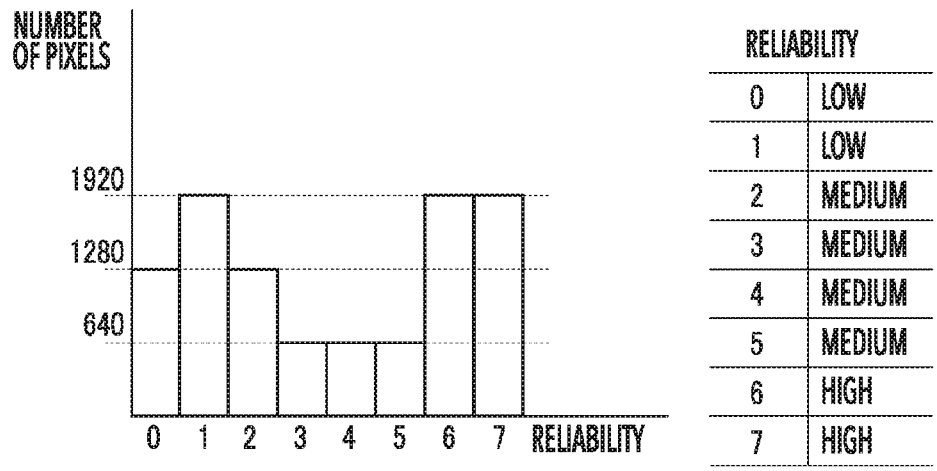
FIG.4D IN A CASE WHERE RELIABILITY 1 IS HANDLED AS MEDIUM, NUMBER OF PIXELS IS 5,120 AND THIS IS NOT ACCEPTABLE

IMAGE PROCESSING APPARATUS, IMAGE CAPTURING APPARATUS, IMAGE PROCESSING METHOD AND STORAGE MEDIUM

BACKGROUND OF THE INVENTION

Field of the Invention

The present invention relates to a distance-measuring technology to calculate an object distance based on image data.

Description of the Related Art

Conventionally, in the digital camera, a technology is known which detects a distance to an object by arranging a pixel having the distance-measuring function (hereinafter, also referred to as "distance-measuring pixel") as part or all of the pixels within an image capturing element and using the phase difference method.

In the method such as this, the configuration is designed so that light fluxes having passed through different areas on the pupil of an image capturing lens are guided to different photoelectric conversion units by arranging a plurality of the photoelectric conversion units in the distance-measuring pixels. By a signal output by the photoelectric conversion unit arranged in each distance-measuring pixel, light images (hereinafter, referred to as "A picture" and "B picture", respectively) generated by the light fluxes having passed through different pupil areas can be acquired and it is possible to acquire a plurality of images based on the A picture and the B picture, respectively. The pupil area corresponding to the A picture and the pupil area corresponding to the B picture are eccentric in directions different from each other along an axis called a pupil division direction.

Between a plurality of acquired images (hereinafter, referred to as "A image" and "B image", respectively), a relative positional shift (also referred to as disparity) in accordance with a defocus amount occurs along the pupil division direction. This positional shift is called an image shift and the amount of the image shift is called an image shift amount. By converting the image shift amount into the defocus amount via a predetermined conversion coefficient, it is possible to calculate the distant to an object. By using the method such as this, unlike the conventional contrast method, it is not necessary to move the image capturing lens in order to measure a distance, and therefore, high-speed and high-accuracy distance measurement is enabled.

For the calculation of an image shift amount, generally, an area-based corresponding point search technology called template matching is used (see Japanese Patent Laid-Open No. 2003-269917). In the plate matching, one of the A image and the B image is taken as a criterion image and the other image is taken as a reference image. Further, on the criterion image, a local area (hereinafter, referred to as collation area) with a point of interest being taken as a center is set and at the same time, on the reference image also, a collation area with a reference point corresponding to the point of interest being taken as a center is set. Then, while sequentially moving the reference point, a point at which the correlation (that is, degree of similarity) between the A image and the B image within the collation area becomes highest is searched for. By the relative positional shift amount between this point and the point of interest, the image shift amount is calculated.

In a case where the image shift amount is calculated by using template matching, such a problem may occur that the calculation error in the image shift amount becomes large resulting from reliability of an image included in the collation area. The reliability of an image referred to here is the degree of contrast mainly within the collation area. For example, in a case where the contrast of the image within the collation area is high, the change in the degree of similarity becomes large and it is possible to correctly calculate the corresponding point, and therefore, reliability becomes high. On the other hand, in a case where the contrast of the image within the collation area is low, the change in the degree of similarity becomes small and it is no longer possible to correctly calculate the corresponding point, and therefore, reliability becomes low and the calculation error in the image shift amount may become large.

Further, in recent years, an increase in speed and accuracy of the distance-measuring function is demanded and at the same time, a reduction in size of the apparatus itself is also demanded and there is an increasing demand for a reduction in power consumption. Consequently, a technology is known which makes an attempt to reduce power consumption by moving the distance-measuring image capturing element into the power saving mode and terminating supply of an operation clock in a case where the AF (Auto Focus) operation is not necessary, such as a case where image capturing processing is not being performed (see Japanese Patent Laid-Open No. 2012-163923).

In the template matching described previously, in a case where reliability of the image included in the collation area is low, it is possible to suppress the influence of noise and increase the distance measurement accuracy by increasing the size of the collation area. However, in a case where the size of the collation area is increased, the amount of calculation is also increased, and therefore, the power consumption of the apparatus increases.

SUMMARY OF THE INVENTION

The present invention has been made in view of the problem such as this and an object is to improve the distance measurement accuracy without increasing the power consumption of the image processing apparatus that performs distance-measuring processing.

In one embodiment of the present invention, the image processing apparatus for calculating distance information on an image has a first calculation unit configured to calculate reliability in accordance with contrast for each pixel of the image and a second calculation unit configured to calculate distance information on each of the pixels based on reliability of each of the pixels. The second calculation unit calculates the distance information about a second pixel group whose reliability is lower than that of a first pixel group by using a collation area whose size is larger than a predetermined size in a range in which an amount of calculation in a case where a collation area of the predetermined size is used for all the pixels of the image is not exceeded.

Further features of the present invention will become apparent from the following description of exemplary embodiments with reference to the attached drawings.

BRIEF DESCRIPTION OF THE DRAWINGS

FIG. 4A is a diagram showing a histogram and reliability classified according to threshold value in the first embodiment;

FIG. 4B is a diagram showing an example of a case where the threshold value setting of reliability "high" is changed for the histogram in FIG. 4A;

FIG. 4C is a diagram showing an example of a case where the collation area of reliability "medium" is changed for the histogram in FIG. 4A;

FIG. 4D is a diagram showing an example of a case where the shape of the histogram is different from that in FIG. 4A;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically. All combinations of features explained in the present embodiments are not necessarily indispensable to the present invention. In the present invention, a variety of modification aspects within the range not deviating from the gist of the present invention are included. Further, it may also be possible to configure the present invention by combining part of the following embodiments.

First Embodiment

Figure 1:
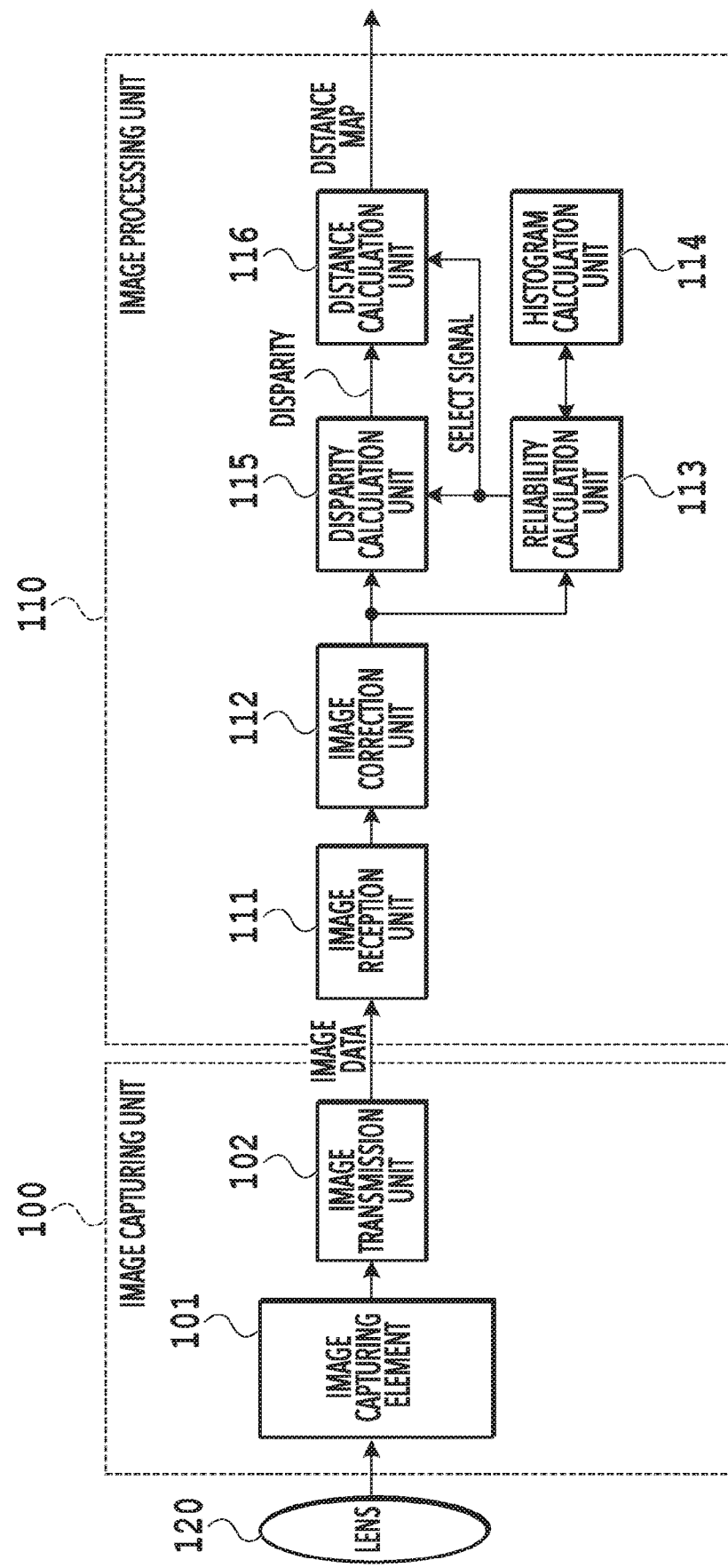
FIG. 1 is a block diagram showing a schematic configuration of hardware of an image processing apparatus in a first embodiment.

FIG. 1 shows a schematic configuration of hardware of an image processing apparatus in a first embodiment.

An image capturing lens 120 forms the image of an object on an image capturing element 101, which is the image capturing surface of an image capturing unit 100. The image capturing lens 120 includes a plurality of lens groups and an aperture.

The image capturing unit 100 generates image data on the object image formed on the image capturing element 101 and transmits the image data to an image processing unit 110 by an image transmission unit 102. That is, the image capturing unit 100 can function as an image capturing apparatus.

The image capturing element 101 is an image sensor including a CMOS (Complementary Metal Oxide Semiconductor) or a CCD (Charge Coupled Device). The object image formed on the image capturing element 101 via the image capturing lens 120 is converted into an electric signal by the image capturing element 101. Normally, the image capturing element 101 comprises a color filter and forms an object image by transmitting only the desired color information. The image capturing element 101 has an image capturing pixel that outputs an electric signal for a captured image and a distance-measuring pixel that outputs an electric signal for distance measurement. The electric signal that is output from an image capturing pixel group is converted into image data for a captured image. The electric signal that is output from a distance-measuring pixel group is converted into image data for distance measurement. Unless otherwise stated particularly, the image data in the present embodiment refers to image data for distance measurement.

The image transmission unit 102 transmits the electric signal converted by the image capturing element 101 to the image processing unit 110 as image data.

The image processing unit 110 has an image reception unit 111, an image correction unit 112, a reliability calculation unit 113, a histogram calculation unit 114, a disparity calculation unit 115, and a distance calculation unit 116 and receives image data from the image capturing unit 100 and generates a distance map. The distance map is image data indicating the distance from the image capturing element 101 to an object by a pixel value.

The image reception unit 111 receives image data that is transmitted from the image capturing unit 100.

The image correction unit 112 performs correction processing necessary as preprocessing for the image data for distance measurement that is sent form the image reception unit 111. Generally, in the image data generated via the optical system image capturing lens 120, luminance unevenness due to a decrease in peripheral brightness occurs. In a case where distance-measuring processing is performed in the state where the luminance unevenness has occurred, the distance measurement accuracy is degraded, and therefore, image processing, such as shading correction to improve the luminance unevenness, is performed as preprocessing.

The reliability calculation unit 113 calculates reliability of each pixel of image data and outputs the reliability to the disparity calculation unit 115 and the distance calculation unit 116 as a select signal indicating the level of reliability. The reliability indicates the degree of contrast in the area to which the pixel belongs and indicates the certainty of the image shift amount (that is, disparity) that is calculated based on the degree of similarity between images. The higher the reliability, the more accurately the corresponding points between images can be detected, and therefore, it is also possible to accurately calculate the image shift amount.

The histogram calculation unit 114 calculates a histogram of reliability calculated by the reliability calculation unit 113. Specifically, the histogram calculation unit 114 counts the number of pixels of each level of reliability.

The disparity calculation unit 115 performs template matching in accordance with the reliability calculated by the reliability calculation unit 113 and calculates a disparity of each pixel. The calculated disparity is output to the distance calculation unit 116 as a disparity map indicating a disparity of each pixel.

Figure 2:
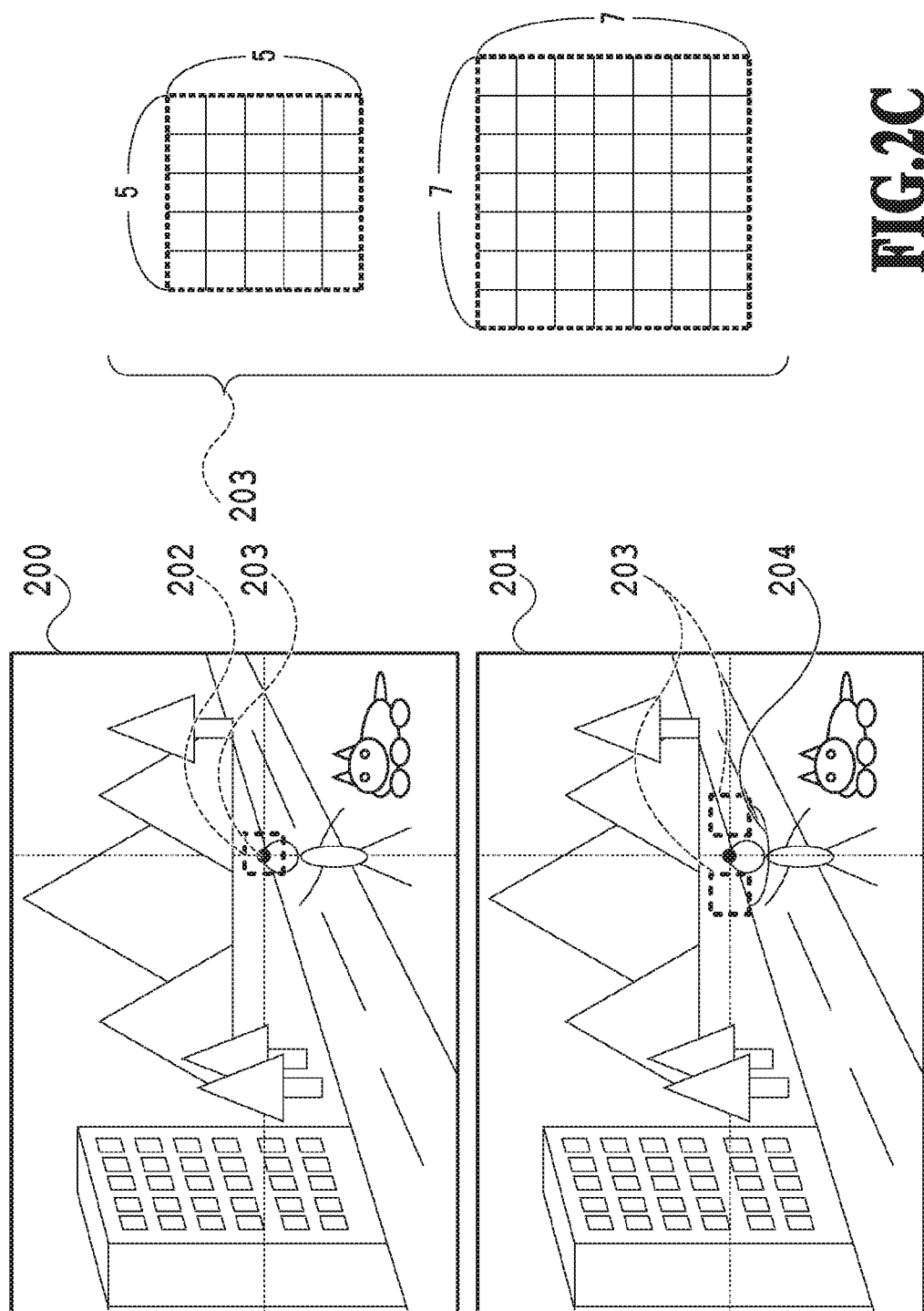
FIG. 2A is a diagram showing a criterion image in template matching in the first embodiment.
FIG. 2B is a diagram showing a reference image in template matching in the first embodiment.
FIG. 2C is a diagram showing examples of a collation area in template matching in the first embodiment.

FIG. 2A to FIG. 2C are diagrams explaining template matching in the present embodiment. FIG. 2A shows a criterion image 200 and FIG. 29 shows a reference image 201. While sequentially moving a search range 204 of the reference image 201 for a collation area 203 including a point of interest 202 of the criterion image 200, the position of the collation area whose degree of similarity is highest is specified and the distance of the position from the point of interest 202 is taken as a disparity. FIG. 2C shows examples of the collation area, including 5×5 pixels and 7×7 pixels, respectively. In the template matching, by using the collation area such as this, the degree of correlation is calculated. As a calculation method of the degree of correlation, it is possible to use a publicly known method. For example, it is possible to use the method called SSD (Sum of Squared Difference) in which the sum of squared differences of pixel values is taken as an evaluation value. The calculation cost of the template matching increases as the number of pixels in the collation area increases and amount of calculation for the 7×7 collation area is about double that for the 5×5 collation area. The collation area is not limited to this and for example, it may also be possible to set a 7×3 collation area, a 3×7 collation area and the like in accordance with the shape of an edge.

The distance calculation unit 116 calculates distance information on each pixel from the disparity information on each pixel calculated by the disparity calculation unit 115. The distance calculation unit 116 converts the disparity map including the disparity information on each pixel into a distance map including distance information on each pixel and outputs the distance map.

Figure 3:
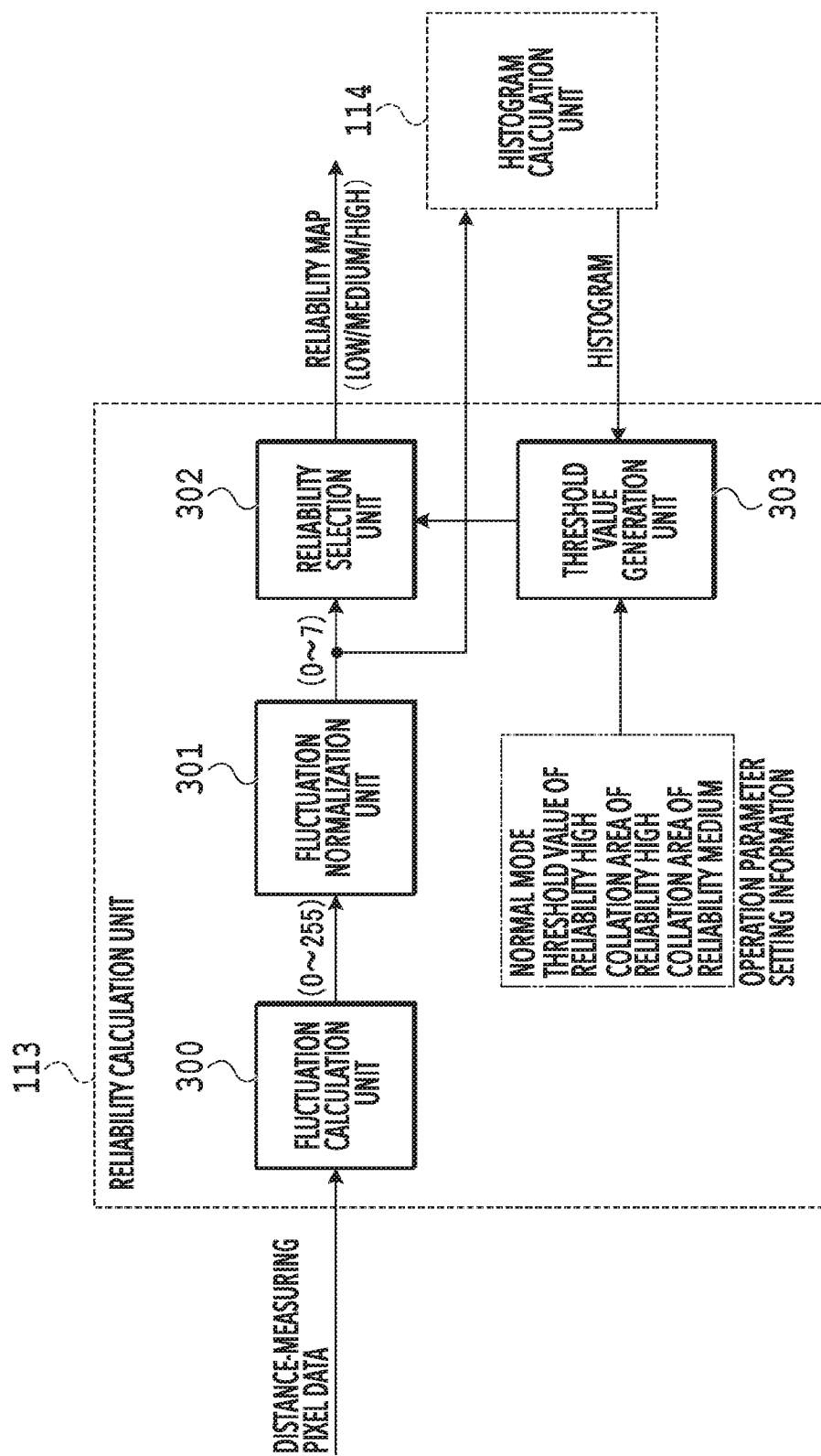
FIG. 3 is a block diagram showing a configuration of a reliability calculation unit in the first embodiment.

FIG. 3 shows the configuration of the reliability calculation unit 113 in the present embodiment. The reliability calculation unit 113 has a fluctuation calculation unit 300, a fluctuation normalization unit 301, a reliability selection unit 302, and a threshold value generation unit 303.

The fluctuation calculation unit 300 calculates the degree of fluctuation by calculating an amount of change in contrast based on the variance of the pixel values in the area in the vicinity of the point of interest. Here, the fluctuation refers to the distribution of the differences of the pixel values. The larger the fluctuation, the higher the reliability in the template matching is. The fluctuation normalization unit 301 normalizes the degree of fluctuation calculated by the fluctuation calculation unit 300 and transmits the results to the histogram calculation unit 114 and the reliability selection unit 302. The threshold value generation unit 303 reads the reliability histogram calculated by the histogram calculation unit 114 and determines a threshold value of the boundary between "low" and "medium" of reliability from the histogram by using the operation parameters set by a user. In the present embodiment, the operation parameters include the operation mode of the image processing apparatus, the threshold value of reliability "high", the size of the collation area of reliability "high", and the size of the collation area of reliability "medium". The reliability of each pixel classified based on the determined threshold value is transmitted to the reliability selection unit 302. The image processing unit 110 has a user interface, not shown schematically, and it is possible for a user to input and set the operation parameters via the user interface.

Here, a calculation method of a threshold value of the boundary between "low" and "medium" of reliability is explained in detail.

First, the threshold value generation unit 303 acquires the threshold value of reliability "high", the collation area information at the time of distance-measuring calculation of reliability "high", and the collation area information at the time of distance-measuring calculation of reliability "medium". Based on the above-described setting information, the threshold value generation unit 303 calculates the number of pixels to which reliability "medium" is allocated in a range in which the number of times of calculation in a case where the template matching is performed for all the pixels in the collation area of reliability "high" is not exceeded and determines the threshold value of the boundary between reliability "low" and reliability "medium". Specifically, the threshold value is calculated so that the following conditions are met.

H_NUM=number of pixels of reliability "high"

M_NUM=(number of times of calculation in collation area of reliability "medium"/number of times of calculation in collation area of reliability "high")*number X of pixels to which reliability "medium" is allocated H_NUM+M_NUM≤total number of pixels In order to calculate the number of times of calculation of each level of reliability, the threshold value generation unit 303 refers to the histogram information calculated by the histogram calculation unit 114 and counts the number of pixels of each level of reliability.

FIG. 4A to FIG. 4D each show an example of a histogram calculated by the histogram calculation unit 114 and reliability information calculated by the threshold value generation unit 303 in the present embodiment. In the example in FIG. 4A to FIG. 4D, it is assumed that the resolution of a processing-target image is a size of 128×80 pixels. That is, the total number of pixels is 10,240. Further, in the histogram, reliability is divided into eight sections of "0" to "7" and the number of pixels of each section is counted. Eight sections are an example and it may also be possible to divide reliability into a different number of sections. Based on the amount of calculation in the collation area in accordance the number of pixels of each section and the set threshold value, one of "low", "medium", and "high" is selected. As described above, to each pixel of image data, one of reliability "low", "medium", and "high" is allocated and a pixel group in accordance with reliability is configured.

In FIG. 4A, the threshold value of reliability "high" is set to "6", the collation area of reliability "high" is set to 5×5 pixels, and the collation area of reliability "medium" is set to 7×7 pixels. According to the histogram, the number (H_NUM) of pixels of reliability "high" is 3,200, which is the sum of 1,280 pixels whose reliability is "7" and 1,920 pixels whose reliability is "6". Further, the number of pixels of the collation area of reliability "high" is 25 and the number of pixels of the collation area of reliability "medium" is 49, and therefore, the calculation ratio (pixel ratio) in the collation area between reliability "high" and reliability "medium" is about 1:2. Consequently, from the above-described conditions, the number X of pixels to which reliability "medium" is allocated is 3,520 ((10,240-3,200)/2). The area whose reliability is low by an amount corresponding to 3,520 pixels from the boundary with reliability "high" is the boundary between reliability "low" and reliability "medium" and in the case of FIG. 4, reliability "3" to "5" is handled as reliability "medium". The number of pixels of reliability "3" to "5" is 2,560 and in a case where the number of pixels of reliability "2" is included, the total number of pixels is 3,840, and therefore, 3,520 pixels, which is the calculated number of pixels to which reliability "medium" is allocated, is exceeded.

FIG. 4B shows an example in a case where the threshold value setting of reliability "high" is changed from that in FIG. 4A. In FIG. 4B, the threshold value of reliability "high" is set to "5", the collation area of reliability "high" is set to 5×5, and the collation area of reliability "medium" is set to 7×7. According to the histogram, the number (H_NUM) of pixels of reliability "high" is 4,480 and the calculation ratio in the collation area between reliability "high" and reliability "medium" is about 1:2, and therefore, the number X of pixels to which reliability "medium" is allocated is about 2,880. The area whose reliability is low by an amount corresponding to 2,880 pixels from the boundary with reliability "high" is the boundary between reliability "low" and reliability "medium" and in the case of FIG. 4B, reliability "2" to "4" is handled as reliability "medium".

FIG. 4C shows an example in a case where the collation area of reliability "medium" is changed from that in FIG. 4A. In FIG. 4C, the threshold value of reliability "high" is set to 6, the collation area of reliability "high" is set to 5×5, and the collation area of reliability "medium" is set to 9×9. According to the histogram, the number (H_NUM) of pixels of reliability "high" is 3,200 and the calculation ratio in the collation area between reliability "high" and reliability "medium" is about 1:3, and therefore, the number X of pixels to which reliability "medium" is allocated is 2,172. The area whose reliability is low by an amount corresponding to 2,172 pixels from the boundary with reliability "high" is the boundary between reliability "low" and reliability "medium" and in the case of FIG. 4C, reliability "4" to "5" is handled as reliability "medium".

FIG. 4D shows an example in a case where the shape of the histogram is different from that in FIG. 4A. In FIG. 4D, the threshold value of reliability "high" is set to "6", the collation area of reliability "high" is set to 5×5, and the collation area of reliability "medium" is set to 7×7. According to the histogram, the number of pixels of reliability "high" is 3,840 and the calculation ratio in the collation area between reliability "high" and reliability "medium" is about 1:2, and therefore, the number X of pixels to which reliability "medium" is allocated is 3,265. The area whose reliability is low by an amount corresponding to 3,265 pixels from the boundary with reliability "high" is the boundary between reliability "low" and reliability "medium" and in the case of FIG. 4D, reliability "2" to "5" is handled as reliability "medium".

The reliability selection unit 302 generates a reliability map in which the reliability of each pixel is classified based on the threshold values (low, medium, high) of the reliability calculated by the threshold value generation unit 303. In the present embodiment, reliability is classified into three levels of low, medium, and high, but the classification is not limited to this and it may also be possible to classify reliability into more levels.

Figure 5:
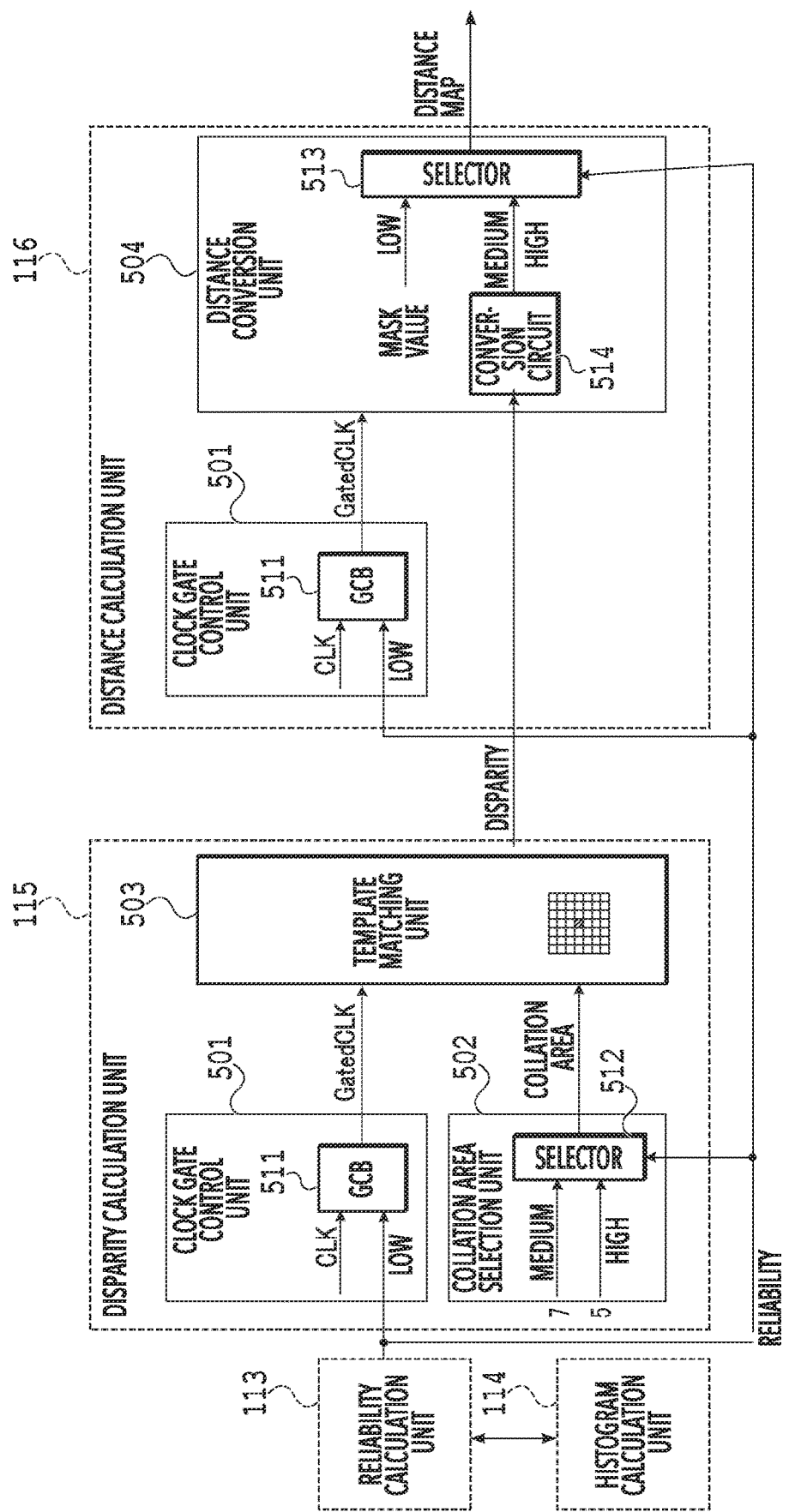
FIG. 5 is a configuration diagram of a disparity calculation unit and a distance calculation unit in the first embodiment.

FIG. 5 shows the configuration of the disparity calculation unit 115 and the distance calculation unit 116 in the present embodiment. Here, switching processing of the disparity calculation unit 115 and the distance calculation unit 116 based on the reliability map generated by the reliability calculation unit 113 is explained.

The disparity calculation unit 115 has a clock gate control unit 501, a collation area selection unit 502, and a template matching unit 503.

The distance calculation unit 116 has the clock gate control unit 501 and a distance conversion unit 504.

The clock gate control unit 501 terminates clock (CLK) supply to the template matching unit 503 and the distance conversion unit 504, which are calculation units, in a case where reliability is "low" via a GCB (gating clock buffer) 511. That is, in the present embodiment, a gated clock method is used.

The collation area selection unit 502 has a function (that is, selector 512) to select a collation area in accordance with reliability and in pixels whose reliability is "medium", the collation area selection unit 502 selects a collation area of 7×7 pixels and in pixels whose reliability is "high", selects a collation area of 5×5 pixels. The size of the collation area of each level of reliability is set in advance by a user. As regards the pixels whose reliability is "high", it is possible to perform matching with a high accuracy by setting the size of the collation area to 5×5 pixels. On the other hand, as regards the pixels whose reliability is "medium" lower than "high", the matching accuracy is improved by making an attempt to suppress the influence of noise, and the like by using a wider collation area of 7×7 pixels.

The template matching unit 503 performs matching processing in accordance with reliability. In pixels whose reliability is "low", the clock supply is terminated, and therefore, the calculation of template matching is skipped. In the pixels whose reliability is "medium", the template matching is performed in the collation area of 7×7 pixels and disparity information is output. In the pixels whose reliability is "high", the template matching is performed in the collation area of 5×5 pixels and disparity information is output.

The distance conversion unit 504 generates a distance map in accordance with reliability by a selector 513. In the pixels whose reliability is "low", the template matching unit 503 does not calculate disparity information, and therefore, the distance conversion unit 504 outputs a mask value as a distance map without operating a conversion circuit 514. In the pixels whose reliability is "medium" and "high", the disparity information calculated by the template matching unit 503 is converted into distance information by the conversion circuit 514 and the distance information is output as a distance map indicating distance information on each pixel.

Figure 6:
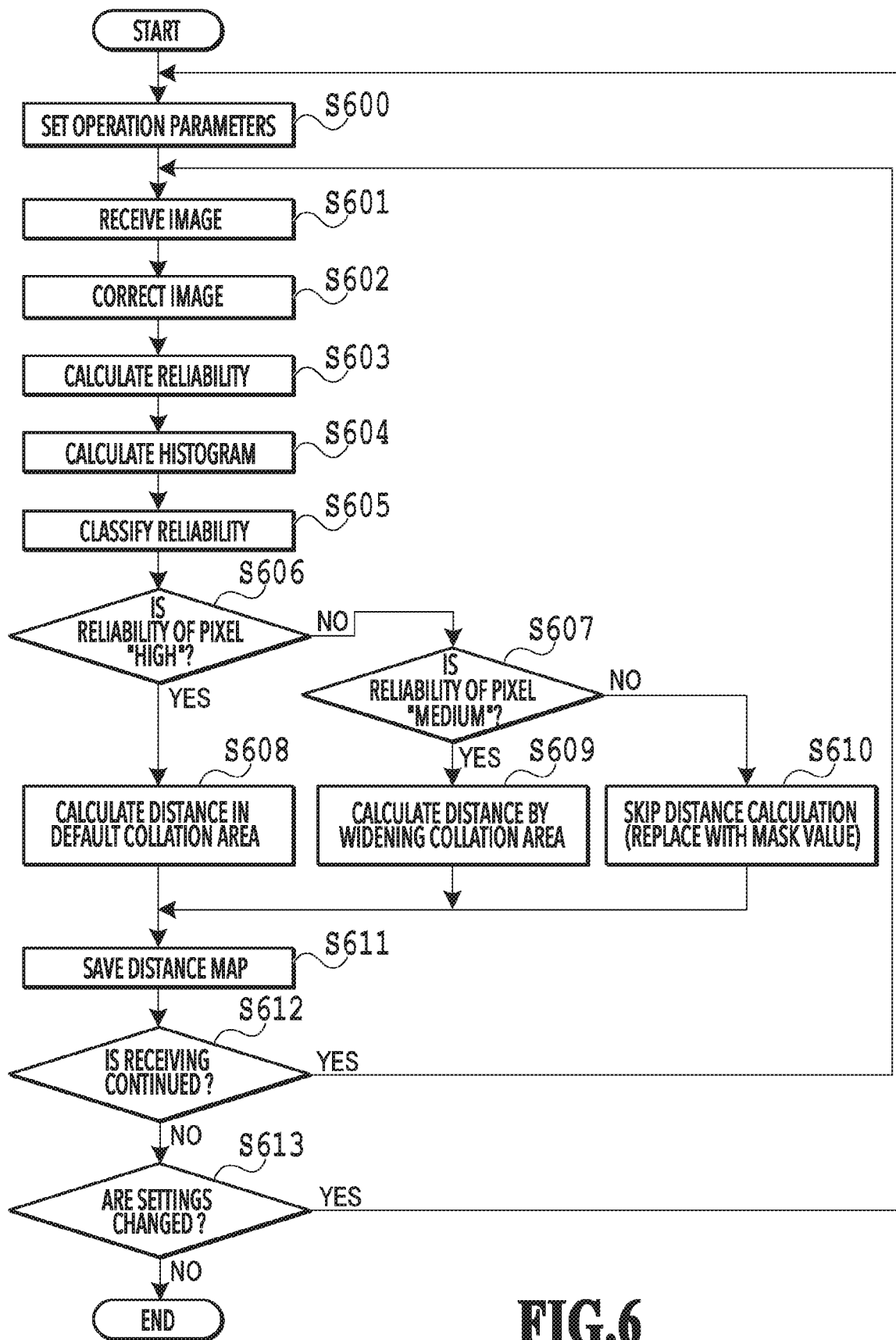
FIG. 6 is a flowchart of image processing in the first embodiment.

FIG. 6 shows a flowchart of image processing (distance map generation processing) by the image processing unit 110 of the present embodiment. The series of processing shown by the flowchart is performed by the CPU of the image processing unit 110 loading a control program stored in the ROM or HDD onto the RAM and executing the control program. Alternatively, it may also be possible to implement part or all of the functions at steps in the flowchart by hardware, such as an ASIC and an electronic circuit. Symbol "S" in explanation of the flowchart means a "step" in the flowchart. This also applies to other flowcharts.

First, at S600, the image processing unit 110 sets the operation parameters specified by a user. The operation parameters include the operation mode, the threshold value of reliability, and the size of the collation area.

At S601, the image reception unit 111 receives image data for distance measurement, which is output by the image capturing unit 100. In the following, the image data for distance measurement is also referred to as distance-measuring image data.

At S602, the image correction unit 112 performs correction processing, such as shading correction, for the received distance-measuring image data.

At S603, the reliability calculation unit 113 calculates reliability of each pixel by calculating an amount of change in contrast from the variance of the neighboring area for each pixel for the distance-measuring image data for which the correction processing has been performed.

At S604, the histogram calculation unit 114 calculates a histogram of reliability by counting the number of pixels of the distance-measuring image data for each level of reliability.

At S605, the reliability calculation unit 113 classifies reliability into "low", "medium", or "high" for each pixel based on the calculated histogram and the set threshold values of reliability.

At S606, the image processing unit 110 determines whether the processing-target pixel is a pixel whose reliability is high. In a case where reliability is "high", the processing advances to S608. On the other hand, in a case where reliability is not "high", the processing advances to S607.

At S607, the image processing unit 110 determines whether reliability of the processing-target pixel is "medium". In a case where reliability is "medium", the processing advances to S609. On the other hand, in a case where reliability is not "medium", that is, in a case where reliability is "low", the processing advances to S610.

At S608, in the pixels whose reliability is "high", the disparity calculation unit 115 calculates disparity information by performing template matching in the default collation area and the distance calculation unit 116 calculates distance information from the disparity information.

At S609, in the pixels whose reliability is "medium", the disparity calculation unit 115 calculates disparity information by widening the collation area and performing template matching, and the distance calculation unit 116 calculates distance information from the disparity information.

At S610, in the pixels whose reliability is "low", the disparity calculation unit 115 terminates clock supply and skips the template matching processing, and the distance calculation unit 116 outputs a mask value as a distance map. In the present embodiment, by skipping the template matching processing for the pixels whose reliability is "low", it is possible to reduce the number of times of calculation and reduce power consumption.

At S611, the distance calculation unit 116 saves the distance map indicating distance information on each pixel in the memory.

At S612, the image processing unit 110 determines whether to continue receiving image data without changing the settings. In a case where receiving is continued, the processing returns to S601 and the processing is repeated for new image data. On the other hand, in a case where receiving is not continued, the processing advances to S613.

At S613, the image processing unit 110 determines whether to perform the processing again by changing the settings of the operation parameters. In a case where the processing is performed again by changing the settings, the processing returns to S600 and the processing is repeated by acquiring the changed operation parameters. On the other hand, in a case where the settings are not changed, the processing is terminated.

As explained above, the image processing apparatus in the present embodiment performs distance-measuring processing for image data and generates a distance map indicating an object distance of each pixel.

Figure 7:
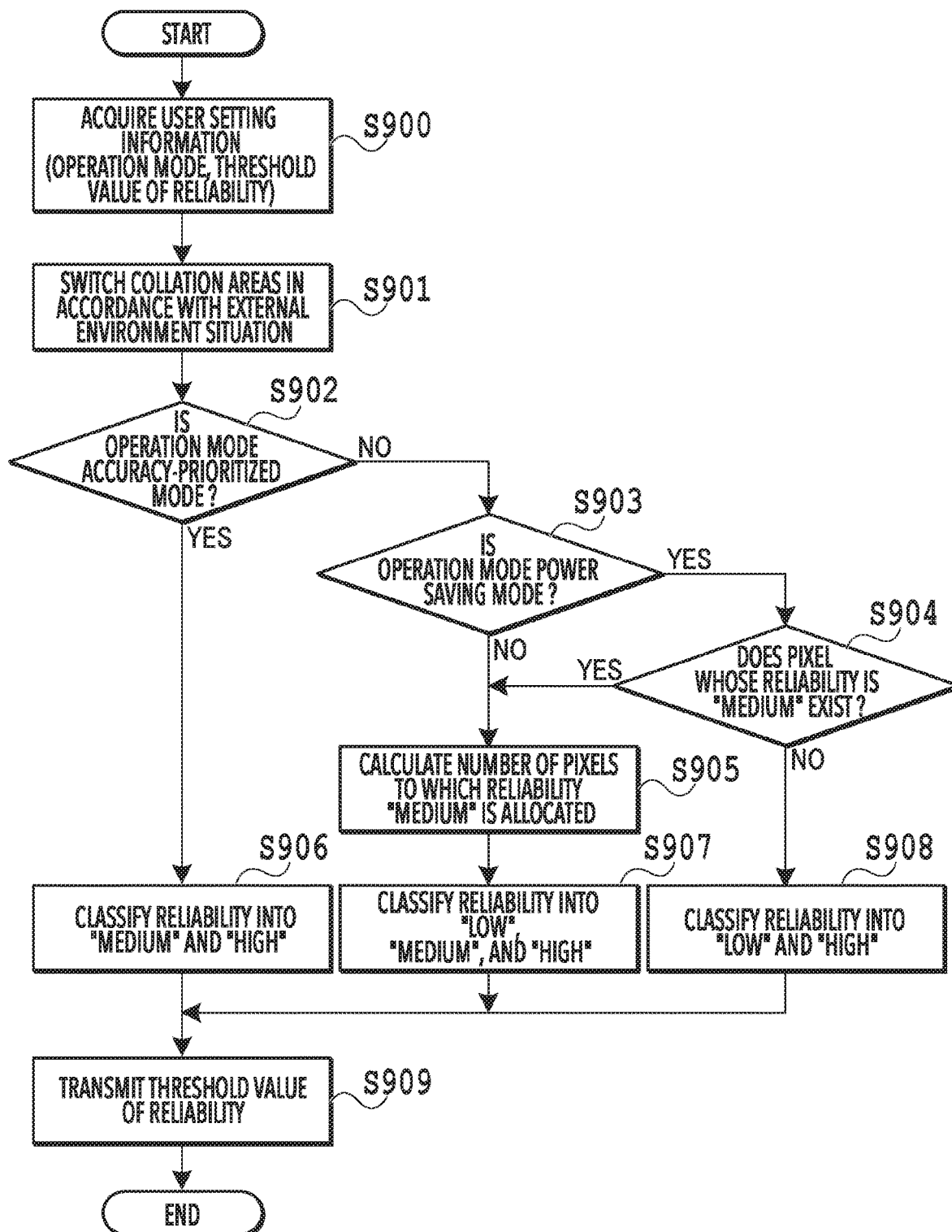
FIG. 7 is a flowchart of processing to generate a threshold value of reliability in the first embodiment.

FIG. 7 shows a flowchart of reliability threshold value generation processing in the present embodiment. The reliability threshold value generation processing is performed by the threshold value generation unit 303 of the reliability calculation unit 113.

At S900, the threshold value generation unit 303 acquires user setting information including the operation mode set by a user and the threshold value of reliability.

At S901, it may also be possible for the threshold value generation unit 303 to perform switching of the collation area in accordance with the external environment situation, such as environment illumination detected by a sensor, not shown schematically. For example, in a case where image capturing is performed at a dark position, such as during night, noise is likely to occur in an image. Consequently, by widening the collation area in order to suppress the influence of noise and using a larger size collation area, it is possible to improve the accuracy of template matching.

At S902, the threshold value generation unit 303 determines whether the operation mode is an accuracy-prioritized mode. The accuracy-prioritized mode is an operation mode in which priority is given to the accuracy of template matching over the suppression of power consumption. In the accuracy-prioritized mode, disparity information is calculated by performing template matching even for the pixel whose reliability is low and from the disparity information, distance information is calculated. In a case where the operation mode is the accuracy-prioritized mode, the processing advances to S906. On the other hand, in a case where the operation mode is other than the accuracy-prioritized mode, the processing advances to S903.

At S903, the threshold value generation unit 303 determines whether the operation mode is a power saving mode. The power saving mode is an operation mode in which priority is given to the suppression of power consumption over the accuracy of template matching. In the power saving mode, power consumption is suppressed by skipping template matching for the pixel whose reliability is low. In a case where the operation mode is the power saving mode, the processing advances to S904. On the other hand, in a case where the operation mode is not the power saving mode, the processing advances to S905. In this case, the operation mode is the normal mode.

At S904, the threshold value generation unit 303 determines whether there exists a pixel whose reliability is "medium". Specifically, the threshold value of reliability "low" and the threshold value of reliability "high", which are set by a user, are compared and in a case where the threshold values are adjacent to each other (for example, in a case where the threshold values are consecutive integer values) reliability "medium" does not exist, and therefore, the processing advances to S908. On the other hand, in a case where reliability "medium" exists, the processing advances to S905.

At S905, the threshold value generation unit 303 calculates the number of pixels to which reliability "medium" is allocated from the histogram information and the reliability threshold value settings as described above.

At S906, the threshold value generation unit 303 classifies reliability into reliability "medium" and reliability "high" based on the reliability threshold value setting (specifically, threshold value setting of reliability "high").

At S907, the threshold value generation unit 303 classifies reliability into reliability "low", reliability "medium", and reliability "high" based on the number of pixels to which reliability "medium" is allocated, which is calculated at S905.

At S908, the threshold value generation unit 303 classifies reliability into reliability "low" and reliability "high" based on the reliability threshold value setting (specifically, threshold value setting of reliability "high").

At S909, the threshold value generation unit 303 transmits the determined reliability threshold values to the reliability selection unit 302.

As explained above, in the present embodiment, in the range in which the number of times of calculation in a case where template matching is performed for all the pixels of the image in the collation area of reliability "high" is not exceeded, the number of pixels to which reliability "medium" is allocated is calculated and the boundary between reliability "low" and reliability "medium" is determined. By doing so, for the pixels whose reliability is "high", the distance-measuring calculation is performed in the minimum necessary collation area and the collation area of the pixels whose reliability is "medium" is widened in a range in which power consumption is not increased, and therefore, it is made possible to take a balance between the suppression of an increase in power consumption and the improvement of the distance measurement accuracy.

Second Embodiment

In the first embodiment, the method is explained in which the number of pixels to which reliability "medium" is allocated is calculated in the range in which the number of times of calculation in a case where template matching is performed for all the pixels in the collation area of reliability "high" is not exceeded and the boundary between reliability "low" and reliability "medium" is determined. In the present embodiment, a method is explained Which is capable of further suppressing power consumption by a user setting a threshold value of reliability "low" in the power saving mode.

Figure 8:
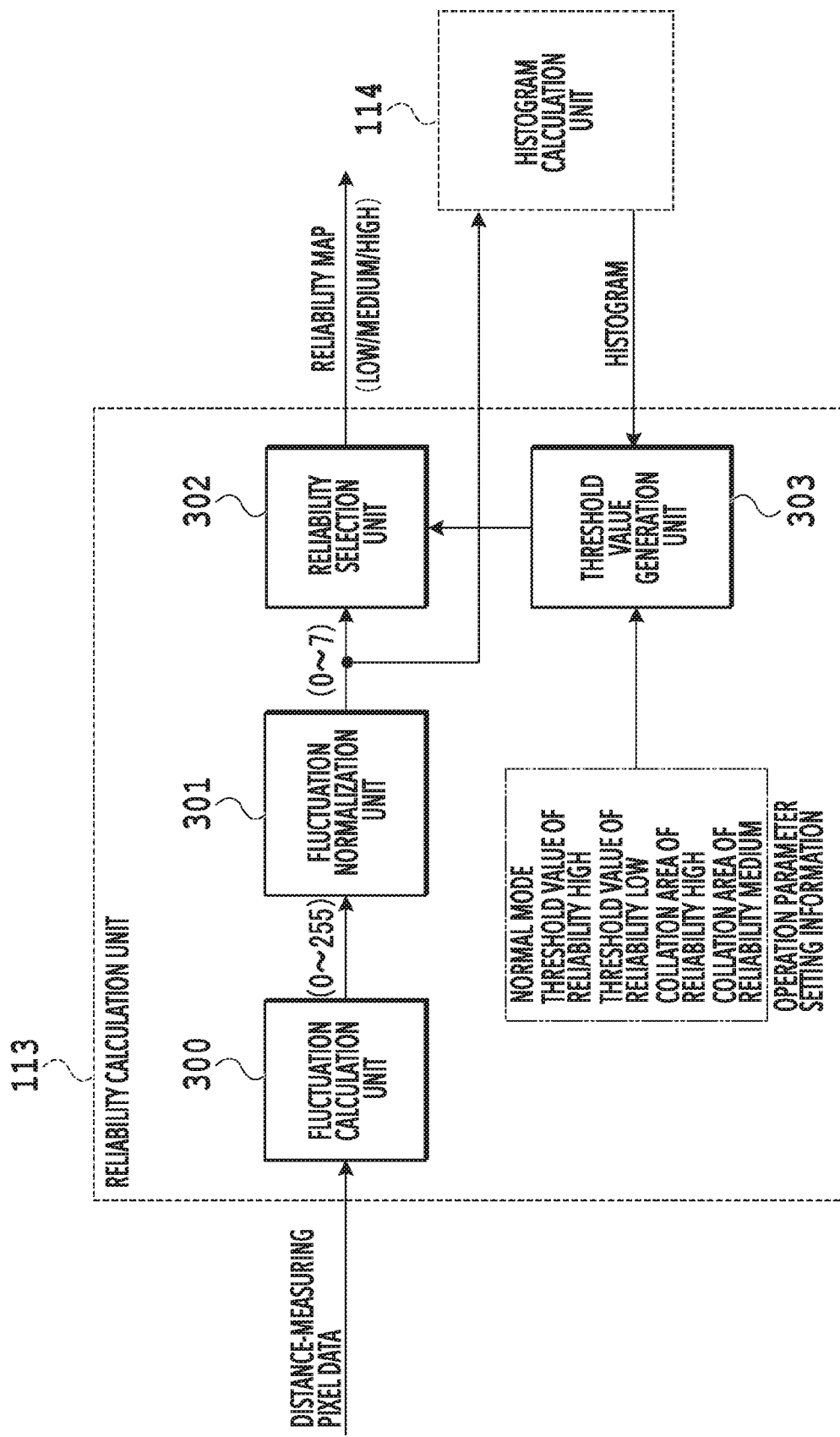
FIG. 8 is a block diagram showing a configuration of a reliability calculation unit in a second embodiment.

FIG. 8 shows the configuration of the reliability calculation unit 113 in the present embodiment. The reliability calculation unit 113 has the fluctuation calculation unit 300, the fluctuation normalization unit 301, the reliability selection unit 302, and the threshold value generation unit 303.

The present embodiment differs from the first embodiment in that the operation parameters that are set by a user include the threshold value of reliability "low" and the threshold value generation unit 303 generates the threshold value of the boundary between reliability "low" and "medium" by using the threshold value of reliability "low". The other configurations are the same. That is, the fluctuation calculation unit 300 calculates the degree of fluctuation by calculating the amount of change in contrast based on the variance of the image of the area in the vicinity of the point of interest. It is determined that the larger the fluctuation, the higher the reliability in the template matching is. The fluctuation normalization unit 301 normalizes the degree of fluctuation calculated by the fluctuation calculation unit 300 and transmits the normalized degree of fluctuation to the histogram calculation unit 114 and the reliability selection unit 302. The threshold value generation unit 303 reads the histogram of reliability calculated by the histogram calculation unit 114 as needed and determines the threshold value of the boundary between reliability "low" and "medium" from the histogram by using the operation parameters set by a user. The determined threshold value is transmitted to the reliability selection unit 302.

Here, a calculation method of the threshold value of the boundary between reliability "low" and "medium" in the present embodiment is explained.

First, the threshold value generation unit 303 acquires the operation mode, the threshold value of reliability "low", the threshold value of reliability "high" and the collation area information at the time of distance-measuring calculation of reliability "high", and the collation area information at the time of distance-measuring calculation of reliability "medium". Based on the above-described setting information, the threshold value generation unit 303 determines whether reliability "medium" exists by comparing the threshold value of reliability "low" and the threshold value of reliability "high". In a case where the threshold value of reliability "low" and the threshold value of reliability "high" are adjacent to each other (for example, in a case where the threshold values are consecutive integer values), reliability "medium" does not exist, and therefore, the calculation of the number of pixels to which reliability "medium" is allocated is not performed. Further, reliability is classified into either "low" or "high", and therefore, the calculation of the histogram is also not performed. On the other hand, in a case where the threshold value of reliability "low" and the threshold value of reliability "high" are not adjacent to each other, the threshold value of the boundary between reliability "low" and reliability "medium" is determined as in the first embodiment. That is, in the range in which the number of times of calculation in a case where template matching is performed for all the pixels in the collation area of reliability "high" is not exceeded, the number of pixels to which reliability "medium" is allocated is calculated and the boundary between reliability "low" and reliability "medium" is determined. Further, in order to calculate the number of times of calculation of each level of reliability, the threshold value generation unit 303 refers to the histogram information (that is, the number of pixels of each level of reliability) calculated by the histogram calculation unit 114.

Figure 9A:
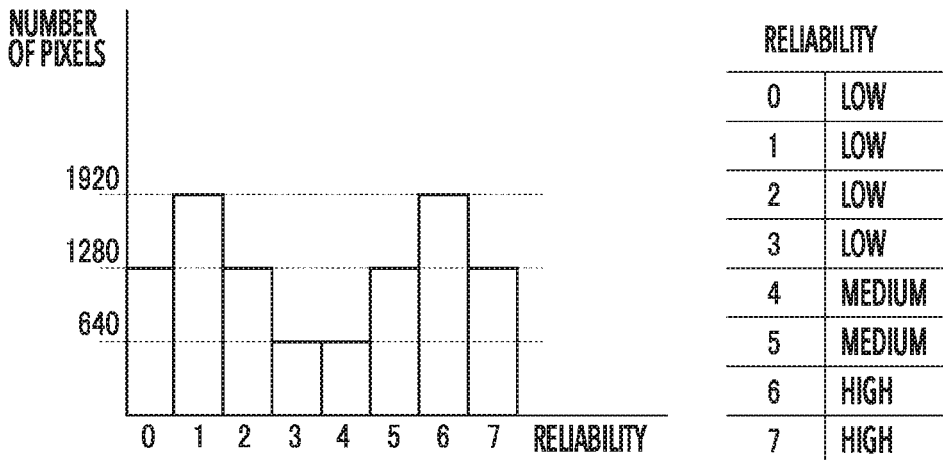
FIG. 9A is a diagram showing a histogram and reliability classified according to threshold value in the second embodiment.
Figure 9B:
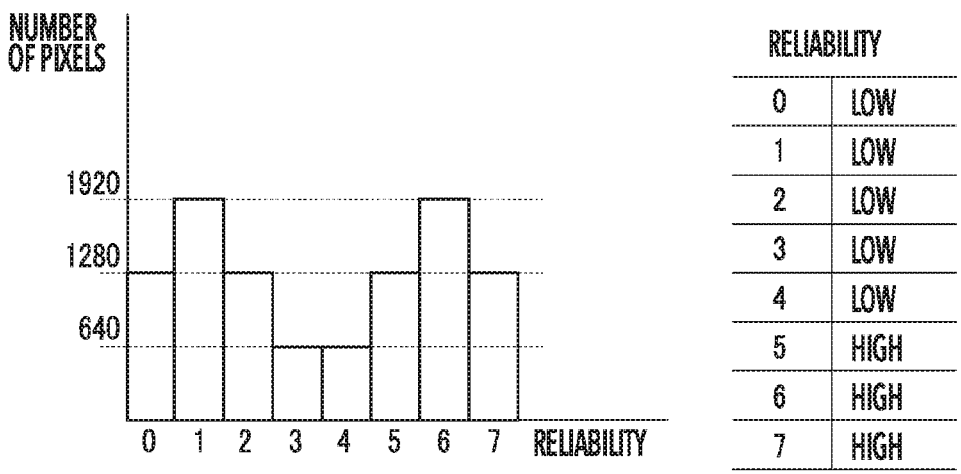
FIG. 9B is a diagram showing an example of a case where the threshold value setting of reliability "high" and the threshold value setting of reliability "low" are changed for the histogram in FIG. 9A.

FIG. 9A and FIG. 9B each show an example of a histogram calculated by the histogram calculation unit 114 and reliability information calculated by the threshold value generation unit 303 in the present embodiment. In the examples in FIG. 9A and FIG. 9B, as in the examples in FIG. 4A to FIG. 4D, it is assumed that the resolution of the processing-target image is the size of 128×80 pixels. Further, reliability is classified into eight sections of "0" to "7" and the number of pixels of each section is counted. Based on the amount of calculation in the collation area and the set threshold value, which are in accordance with the number of pixels of each section, one of "low", "medium", and "high" is selected.

In FIG. 9A, the threshold value of reliability "low" is set to "3", the threshold value of reliability "high" is set to "6", the collation area of reliability "high" is set to 5×5 pixels, and the collation area of reliability "medium" is set to 7×7 pixels. From the relationship between the threshold value of reliability "low" and the threshold value of reliability "high", there is a possibility that the pixel of reliability "medium" exists, and therefore, the number X of pixels to which reliability "medium" is allocated is calculated. According to the histogram, the number (H_NUM) of pixels of reliability "high" is 3,200 and the calculation ratio (pixel ratio) in the collation area between reliability "high" and reliability "medium" is about 1:2. Consequently, by the above-described conditions, the number X of pixels to which reliability "medium" is allocated is 3,520. The number X of pixels to which reliability "medium" is allocated is 3,520 and reliability "5" to "3" is the target of reliability "medium", but the threshold value of reliability "low" is set, and therefore, reliability "3" is reliability "low". Consequently, in the case of FIG. 9A, reliability "4" and "5" is handled as reliability "medium".

FIG. 9B shows an example of a case where the threshold value setting of reliability "high" and the threshold value setting of reliability "low" are changed from those in FIG. 9A. In FIG. 9B, the threshold value of reliability "low" is set to "4", the threshold value of reliability "high" is set to "5", the collation area of reliability "high" is set to 5×5, and the collation area of reliability "medium" is set to 7×7. It may also be possible not to set the collation area of reliability "medium". The threshold value of reliability "low" and the threshold value of reliability "high" are adjacent to each other and there is no area of reliability "medium", and therefore, the calculation of the histogram and the calculation of the number of pixels to which reliability "medium" is allocated are skipped. In the case of FIG. 9B, reliability "4" and lower is handled as reliability "low" and reliability "5" and higher is handled as reliability "high".

In the present embodiment also, the resolution of the image is set to the size of 128×80 pixels, but the resolution as well as the collation area is not limited to this size.

The other configurations, the operation flows and the like are the same as those of the first embodiment, and therefore, explanation is omitted.

As explained above, in the present embodiment, the function to set the threshold value of reliability "low" is provided. In a case where it is desired to further give priority to the suppression of power consumption in the power saving mode, by setting the threshold value of reliability "low" somewhat high and reducing the number of times of calculation of the collation area, it is made possible to enhance the power consumption suppression effect.

Third Embodiment

In the first embodiment, the method is described in which the number of pixels to which reliability "medium" is allocated is calculated in the range in which the number of times of calculation in a case where template matching is performed for all the pixels in the collation area of reliability "high" is not exceeded and the boundary between reliability "low" and reliability "medium" is determined. In the present embodiment, a method in a case where it is desired to give priority to the distance measurement accuracy (that is, accuracy-prioritized mode) over the suppression of power consumption is explained. Specifically, in the present embodiment it is made possible to give priority to improvement of the distance measurement accuracy by the threshold value setting of reliability.

Figure 10:
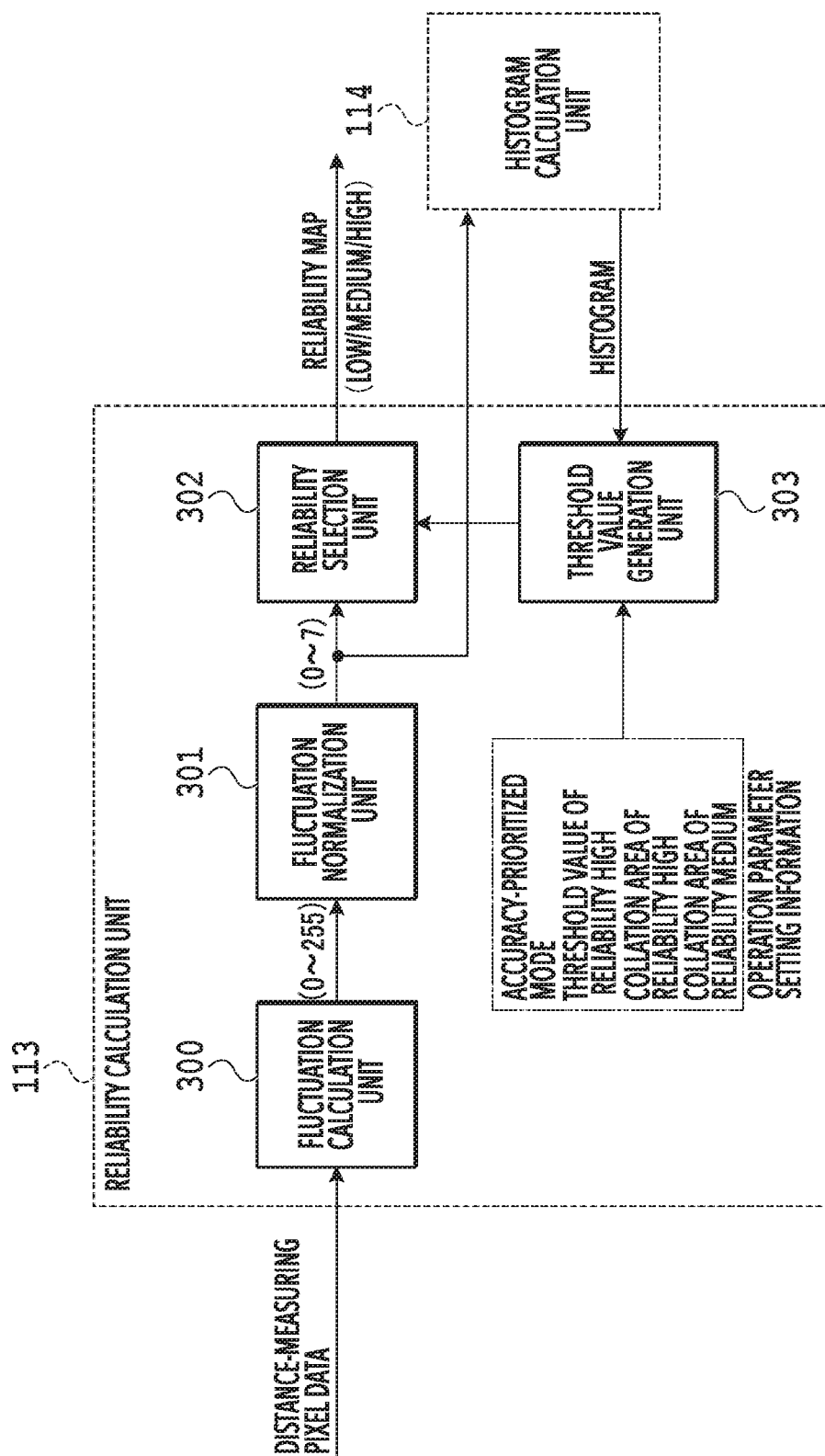
FIG. 10 is a block diagram showing a configuration of a reliability calculation unit in a third embodiment.

FIG. 10 shows the configuration of the reliability calculation unit 113 in the present embodiment. The reliability calculation unit 113 has the fluctuation calculation unit 300, the fluctuation normalization unit 301, the reliability selection unit 302, and the threshold value generation unit 303.

The fluctuation calculation unit 300 calculates the degree of fluctuation by calculating the amount of change in contrast based on the variance of the image of the area in the vicinity of the point of interest. It is determined that the larger the fluctuation, the higher the reliability in the template matching is. The fluctuation normalization unit 301 normalizes the degree of fluctuation calculated by the fluctuation calculation unit 300 and transmits the normalized degree of fluctuation to the reliability selection unit 302. The threshold value generation unit 303 determines the threshold value of the boundary between reliability "high" and "medium" and transits the threshold value to the reliability selection unit 302. As will be described later, in the present embodiment, it may be possible not to use a histogram because the number of pixels to which reliability "medium" is allocated is not calculated.

Here, a calculation method of a threshold value of the boundary between reliability "high" and "medium" in the present embodiment is explained.

First, the threshold value generation unit 303 acquires the operation mode (accuracy-prioritized mode), the threshold value of reliability "high" and the collation area information at the time of distance-measuring calculation of reliability "high", and the collation area information at the time of distance-measuring calculation of reliability "medium". Based on the above-described setting information, the threshold value generation unit 303 handles reliability higher than or equal to the threshold value of reliability "high" as reliability "high" and handles all reliability lower than reliability "high" as reliability "medium". That is, reliability is not classified into reliability "low". In the accuracy-prioritized mode, reliability is classified into either "medium" or "high", and therefore, the calculation of a histogram is not performed.

Figure 11A:
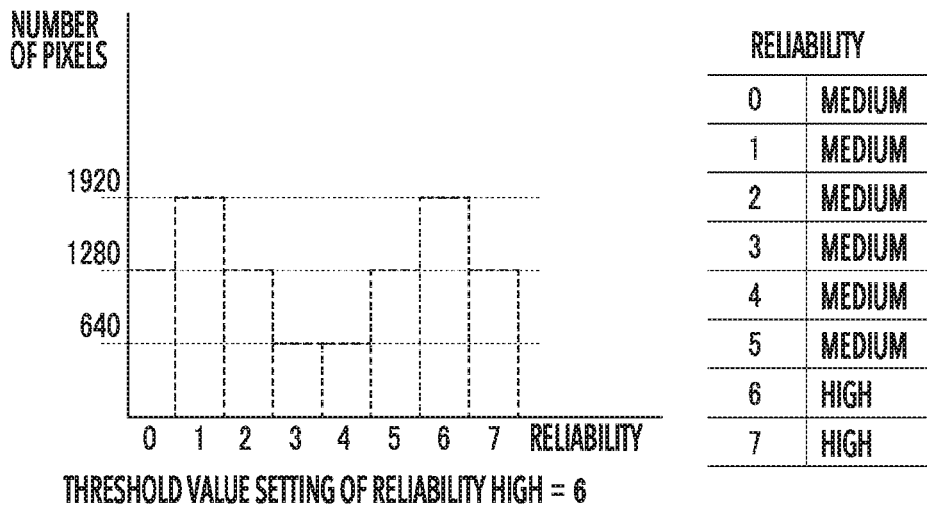
FIG. 11A is a diagram showing reliability classified according to threshold value in the third embodiment.
Figure 11B:
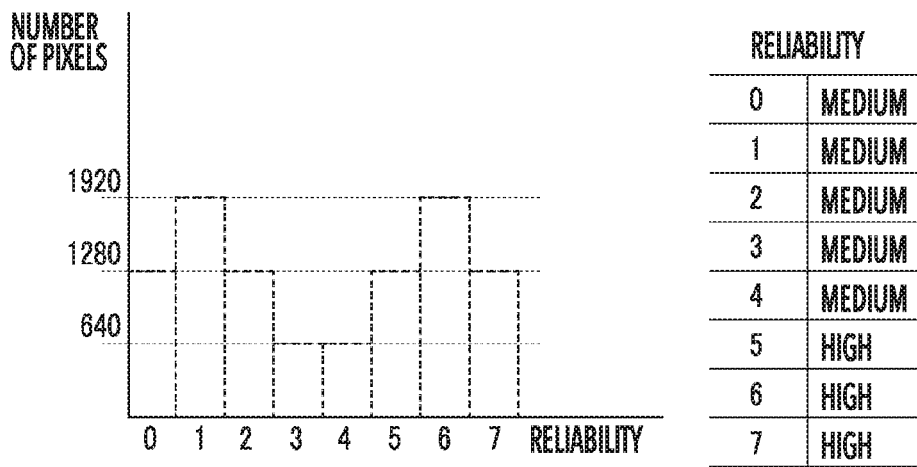
FIG. 11B is a diagram showing an example of a case where the threshold value setting of reliability "high" is changed for the histogram in FIG. 11A.

FIG. 11A and FIG. 11B each show an example of reliability information calculated by the threshold value generation unit 303 in the present embodiment. For reference, histograms are also shown. In the examples in FIG. 11A and FIG. 11B, as in the examples in FIG. 4A to FIG. 4D, the resolution of the processing-target image is set to the size of 128×80 pixels. Further, reliability is classified into eight sections of "0" to "7" and from the threshold value setting of reliability "high", either "medium" or "high" is selected.

In FIG. 11A, the threshold value of reliability "high" is set to "6", the collation area of reliability "high" is set to 5×5 pixels, and the collation area of reliability "medium" is set to 7×7 pixels. In the present embodiment, reliability "low" is not used, and therefore, from the threshold value of reliability "high", reliability "medium" is determined. In the case of FIG. 11A, reliability "0" to "5" is handled as reliability "medium".

FIG. 11B shows an example in a case where the threshold value setting of reliability "high" is changed from that is FIG. 11A. In FIG. 1B, the threshold value of reliability "high" is set to "5", the collation area of reliability "high" is set to 5×5, and the collation area of reliability "medium" is set to 7×7. Similarly, from the threshold value of reliability "high", reliability "medium" is determined. In the case of FIG. 11B, reliability "0" to "4" is handled as reliability "medium".

In the present embodiment also, the resolution of the image is set to the size of 128×80 pixels, but the resolution as well as the collation area is not limited to this size.

The other configurations, the operation flows and the like are the same as those of the first embodiment, and therefore, explanation is omitted.

As explained above, in the present embodiment, by setting the accuracy-prioritized mode and setting the collation area of reliability "medium" and the collation area of reliability "high", it is made possible to make an attempt to improve the accuracy of template matching, that is, to improve the distance measurement accuracy.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiment, it is made possible to improve the distance measurement accuracy without increasing power consumption of an image processing apparatus that performs distance-measuring processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-203288, filed Nov. 8, 2019 which is hereby incorporated by reference wherein in its entirety.

What is claimed is:

1. An image processing apparatus for calculating distance information on an image, comprising:
    a first calculation unit configured to calculate reliability in accordance with contrast for each pixel of the image; and
    a second calculation unit configured to calculate distance information on each of the pixels based on reliability of each of the pixels, wherein
    the second calculation unit calculates the distance information about a second pixel group whose reliability is lower than reliability of a first pixel group by using a first collation area whose size is larger than a predetermined size, and
    the first collation area is set so that an amount of calculation in a case where the first collation area is used does not exceed an amount of calculation in a case where a collation area of the predetermined size is used for all the pixels of the image.

2. The image processing apparatus according to claim 1, wherein
    the second calculation unit does not calculate the distance information for a third pixel group whose reliability is lower than that of the second pixel group.

3. The image processing apparatus according to claim 2, wherein
calculation of the distance information is skipped by supply of a clock that controls an operation of the second calculation unit being terminated.

4. The image processing apparatus according to claim 1, wherein
    each pixel of the image is classified into a plurality of pixel groups in accordance with a threshold value of the reliability, which is set by a user.

5. The image processing apparatus according to claim 1, wherein
    each pixel of the image is classified into a plurality of pixel groups in accordance with a threshold value of the reliability, which is set in accordance with an operation mode.

6. The image processing apparatus according to claim 1, wherein
    a pixel included in the second pixel group is determined based on histogram information on the reliability about each pixel of the image.

7. The image processing apparatus according to claim 1, further comprising:
    a reception unit configured to receive image data on an object image formed on an image capturing element via an image capturing lens.

8. An image processing method for calculating distance information on an image, comprising:
    calculating reliability in accordance with contrast for each pixel of the image; and
    calculating distance information on each of the pixels based on reliability of each of the pixels, wherein
    the distance information about a second pixel group whose reliability is lower than reliability of a first pixel group is calculated by using a first collation area whose size is larger than a predetermined size, and
    the first collation area is set so that an amount of calculation in a case where the first collation area is used does not exceed an amount of calculation in a case where a collation area of the predetermined size is used for all the pixels of the image.

9. A non-transitory computer readable storage medium storing a program for causing a computer to perform a method of calculating distance information on an image, the method comprising:
    calculating reliability in accordance with contrast for each pixel of the image; and
    calculating distance information on each of the pixels based on reliability of each of the pixels; wherein
    the distance information about a second pixel group whose reliability is lower than reliability of a first pixel group is calculated by using a first collation area whose size is larger than a predetermined size, and
    the first collation area is set so that an amount of calculation in a case where the first collation area is used does not exceed an amount of calculation in a case where a collation area of the predetermined size is used for all the pixels of the image.

* * * * *